(12) United States Patent
Han et al.

(10) Patent No.: US 9,215,093 B2
(45) Date of Patent: Dec. 15, 2015

(54) ENCODING PACKETS FOR TRANSPORT OVER SDN NETWORKS

(71) Applicant: Futurewei Technologies, Inc., Plano, TX (US)

(72) Inventors: Lin Han, San Jose, CA (US); Renwei Li, Fremont, CA (US); Katherine Zhao, San Jose, CA (US); Qianglin Quintin Zhao, Boxborough, MA (US)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 14/043,048

(22) Filed: Oct. 1, 2013

(65) Prior Publication Data

US 2014/0119367 A1 May 1, 2014

Related U.S. Application Data

(60) Provisional application No. 61/720,326, filed on Oct. 30, 2012.

(51) Int. Cl.
*H04L 12/28* (2006.01)
*H04L 12/46* (2006.01)
*H04L 12/721* (2013.01)

(52) U.S. Cl.
CPC ............ *H04L 12/4633* (2013.01); *H04L 45/38* (2013.01); *H04L 2212/00* (2013.01)

(58) Field of Classification Search
USPC ......... 370/235, 389, 353, 392, 395.21, 395.5, 370/395.51, 395.52, 465; 726/15
See application file for complete search history.

(56) References Cited

U.S. PATENT DOCUMENTS 7,035,212 B1* 4/2006 Mittal et al. .................. 370/230
2011/0261812 A1* 10/2011 Kini et al. ..................... 370/389
2013/0163475 A1* 6/2013 Beliveau et al. .............. 370/257

FOREIGN PATENT DOCUMENTS

WO 2013130320 A1 9/2013

\* cited by examiner

*Primary Examiner* — Phuongchau Ba Nguyen
(74) *Attorney, Agent, or Firm* — Conley Rose, P.C.; Grant Rodolph; Brandt D. Howell

(57) ABSTRACT

An ingress node in a Software Defined Network (SDN) comprising a receiver for receiving a data packet, a processor coupled to the receiver and further configured to obtain the data packet from the receiver in a transport protocol agnostic manner, and encapsulate the data packet in an SDN packet header, wherein the packet header comprises SDN flow-specific information provided by an SDN controller, and a transmitter coupled to the processor and further configured to transmit the encapsulated data packet across a single SDN toward an egress node in the SDN.

20 Claims, 10 Drawing Sheets

300

400

ENCODING PACKETS FOR TRANSPORT OVER SDN NETWORKS

The present application claims priority to U.S. Provisional Patent Application No. 61/720,326, filed Oct. 30, 2012 by Lin Han, et al., titled "Encoding Packets for Transport over SDN Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g., virtual private network (VPN) requirements) has caused modern networks to become complex and difficult to manage. As a result, vendors and third-party operators seek to customize, optimize, and improve the performance of the interwoven web of network nodes.

A software defined network (SDN) is a network technology that addresses customization and optimization concerns within convoluted networks. SDN architecture allows network administrators to have programmable central control of network traffic without requiring physical access to the network's devices. SDNs may be Internet Protocol (IP) networks utilizing Transmission Control Protocol/Internet Protocol (TCP/IP) protocols. SDNs may decouple the data-forwarding capability, e.g., the data plane, from routing, resource, and other management functionality, e.g., the control plane, previously performed in the network nodes. Decoupling the control plane from the data plane of the network enables the network controller to efficiently control the network traffic through globally optimized traffic engineering and routing, which departs from locally optimized shortest path first (SPF). SDN may also simplify network operations or even have the capabilities to flatten the network with extended data routing vectors.

The extended data routing vectors in SDN can cover network information from multiple Open Systems Interconnection (OSI) layers (e.g. Layer 2 (L2) and/or Layer 3 (L3)) for intelligent routing purposes. A basic approach to achieve decoupling of the network control from the network topology and data plane is by applying globally aware and topology decoupled software control at the edges of the network. The assumption is that traditional topology-coupled bridging and routing may be re-used at the core of the network so that scalability, interoperability, high availability, and extensibility of the conventional networking protocols, such as IP networks, can still be maintained. Network nodes that support SDN, e.g., SDN compliant nodes, may be configured to implement the data plane functions, while the control plane functions may be provided by an SDN controller. A group of nodes, e.g., routers, switches, etc., controlled by a single SDN controller may be referred to as an SDN domain.

SUMMARY

In an example embodiment, the disclosure includes an ingress node in an SDN. The ingress node comprises a transmitter, a receiver for receiving a data packet, and a processor coupled to the transmitter, the receiver, and the memory. In one embodiment, the processor is coupled to the receiver and is further configured to obtain the data packet from the receiver in a transport protocol agnostic manner, and encapsulate the data packet in an SDN packet header, wherein the packet header comprises SDN flow-specific information provided by an SDN controller. The embodiment may further comprise a transmitter coupled to the processor, with the transmitter being further configured to transmit the encapsulated data packet across a single SDN toward an egress node in the SDN.

In another example embodiment, the disclosure includes a method of routing a packet carried out in a network node of an SDN. In one embodiment, the method includes receiving a first data packet and a second data packet in a transport protocol agnostic manner, wherein the first data packet and the second data packet are encoded using different traffic protocols, encoded using the same traffic protocol with different source or destination addresses, or encoded using the same traffic protocol with different service requests, encapsulating the first data packet and the second data packet using a packet header specific to the SDN domain, wherein each packet header comprises a field for identifying at least one packet-specific property and a field for identifying a flow, and transmitting the encapsulated first data packet and the encapsulated second data packet across a single SDN domain to a receiver.

In yet another example embodiment, the disclosure includes a computer program product comprising computer executable instructions stored on a non-transitory medium that when executed by a processor cause the processor to receive a first data packet and a second data packet, receive a first data packet and a second data packet in a transport protocol agnostic manner, wherein the first data packet and the second data packet are encoded using different traffic protocols, using the same traffic protocol with different source or destination addresses, or using the same traffic protocol with different service requests, encapsulate the first data packet and the second data packet, wherein encapsulation comprises appending a packet header provided by an Software Defined Network (SDN) controller to the packet, and transmit the encapsulated first data packet and the encapsulated second data packet across a single SDN domain toward an egress node in the SDN, wherein each packet header comprises a field for identifying at least one packet-specific property and a field for identifying a flow.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes encapsulating packets from a wide variety of competing traffic protocols, e.g., Media Access Control (MAC), IP, Multiprotocol Label Switching (MPLS), Asynchronous Transfer Mode (ATM)/Frame Rate (FR), Synchronous Optical Networking (SONET), etc., using a packet header intelligible by all nodes within the SDN for a particular data flow and/or stream. As used herein, the terms data flow and/or stream may be defined as a series of packets comprising data traffic from a source to at least one destination. By using the SDN flow-specific encapsulation technique, the SDN may be implemented in a transport layer agnostic manner, or without regards to any interfacing traffic protocols. Some embodiments utilize an explicit mode packet header, wherein a multicast tree identifier is placed in a packet header field. Other embodiments utilize an implicit mode packet header, utilizing a lookup table to reference the multicast tree identifier, e.g., to optimize packet size by mapping the identifier(s) in a database. Additionally, some embodiments may identify a particular egress border router and/or transit nodes in the header, while other embodiments do not.

As used herein, a transit node or transit router may be a router inside the SDN domain that does not have any interfaces connecting to outside of the SDN domain. Other embodiments of methods, systems, protocols, and devices are described herein or would be readily apparent to those of ordinary skill in the art, and are considered within the scope of this disclosure.

Figure 1:
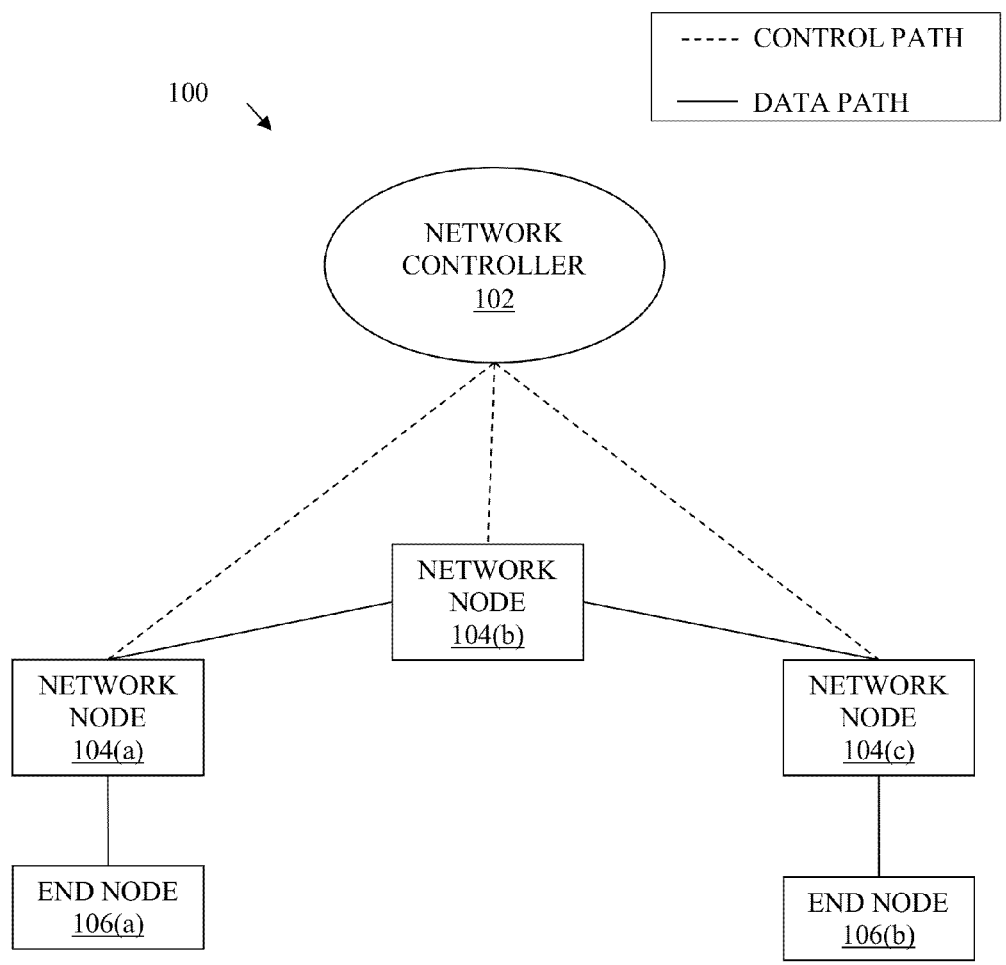
FIG. 1 is a schematic diagram of an example embodiment of an SDN.

FIG. 1 is a schematic diagram of an example embodiment of an SDN network 100. The network 100 may comprise a network controller 102, a plurality of network nodes 104, and a plurality of end nodes 106. The network nodes 104 may comprise switches, routers, bridges, and/or any other device that is used to receive and/or forward data in a network. The control path is represented by dashed lines and the data path is represented by solid lines. System configuration, management information, and routing/forwarding table information may be exchanged between the network controller 102 and the network nodes 104 via the control path. Data packets may be received from end nodes 106 and forwarded between network nodes 104 via the data path. For example, data from end node 106(a) acting as a publisher may be received at network node 104(a) acting as an Ingress Border Router (IBR), routed through network node 104(b) acting as a Transit Router (TR), and passed to end node 106(b) acting as a destination node using network node 104(c) acting as an Egress Border Router (EBR). As used herein, a border router may be a router on the edge of an SDN domain that is connected to at least one node outside of the SDN domain, the IBR may be defined as the SDN border router that receives traffic from outside of the SDN domain, and the EBR may be defined as the SDN border router that sends traffic to outside of the SDN domain. The TR may be defined as an SDN router that transports traffic within the SDN domain and has no interfaces connected to outside of the SDN domain. As will be apparent to those of skill in the art, a single border router may function as an IBR, an EBR, or both, depending on the traffic flow(s). The end nodes 106 may be any network element configured to transmit, receive, originate, and/or terminate data, or, in alternate embodiments, other networks, e.g., IP networks, MPLS networks, etc. The network controller 102 may be a generalized network controller configured to control the network nodes 104. The network controller 102 may be any device configured to perform control path and/or control plane functionality, such as drawing a network map and defining the information in a routing table that defines how to route incoming packets. The network controller 102 may be configured for management and control functionality of the control plane, which may include routing and resource management. The network nodes 104 may include devices that receive and transmit data through the network 100 according to a standard. Some of the network nodes 104 may conform to a standard, e.g. Openflow.

The network controller 102 may receive data from and transmit messages to the network nodes 104. Some of the incoming messages or parts of the incoming messages may be translated into a standard independent format for processing by some of the modules in the network controller 102. The standard independent format may be based on an abstract network control data model that provides an abstraction of the attributes or features of the various standard formats. The network controller 102 may interact with the network nodes 104 via a variety of application programming interface (API) protocols, e.g., Openflow. The network controller 102 may determine the global network topology of the network 100. With the global network topology, state information, dynamic traffic flow/volume information, and other network state information, the network controller 102 may make decisions on how to assign resources and route applications, information, and/or data packet flows through the network 100.

Figure 2:
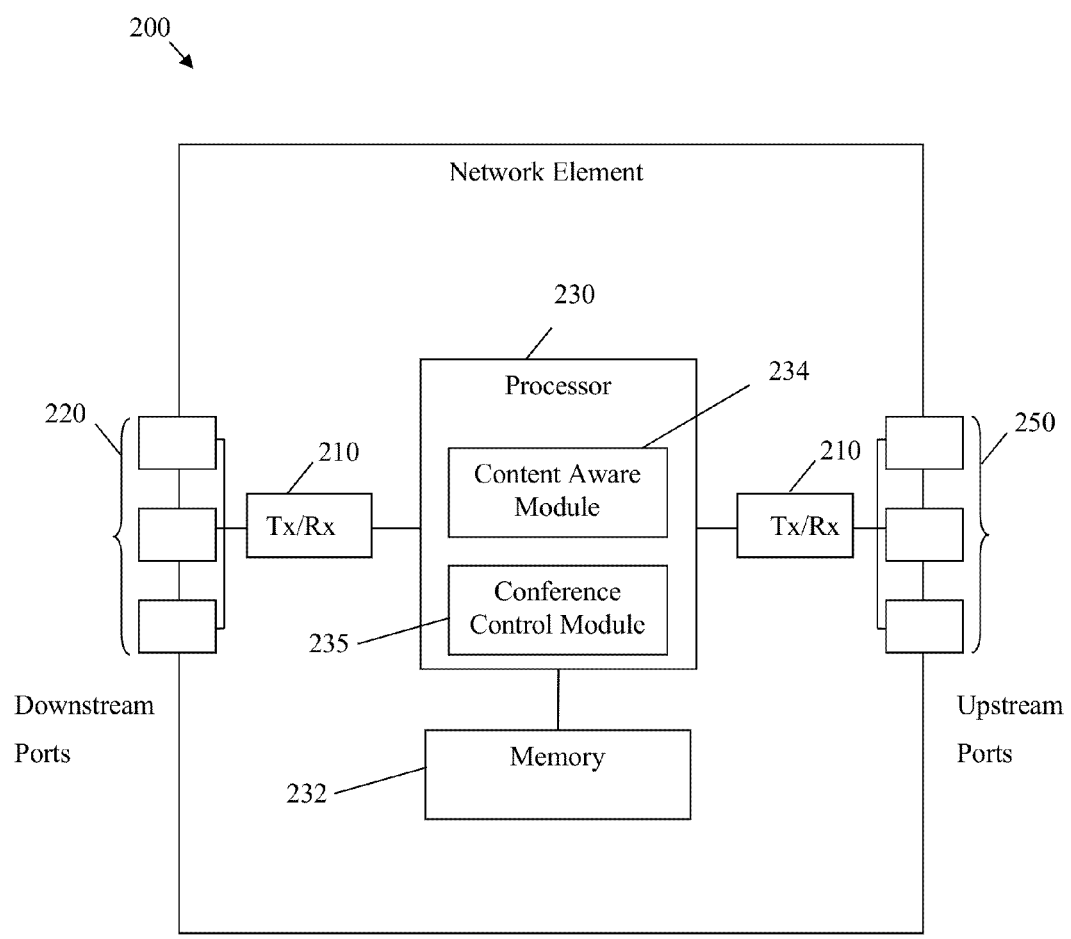
FIG. 2 is a schematic diagram of an example embodiment of a Network Element (NE) within an SDN.

FIG. 2 is a schematic diagram of an example embodiment of an NE 200 within an SDN, which may be a network node 104 in a network 100. In some embodiments, NE 200 may also act as other node(s) in the SDN. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network node, apparatus, or component such as an NE 200. For instance, the features/methods in the disclosure may be implemented using hardware, firmware, and/or software installed to run on hardware. The NE 200 may be any device that transports data, e.g., packets, frames, flows, and/or data streams, through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to a plurality of downstream ports 220 for transmitting and/or receiving frames from other nodes, and a Tx/Rx 210 may be coupled to a plurality of upstream ports 250 for transmitting and/or receiving frames from other nodes, respectively. A processor 230 may be coupled to the Tx/Rx 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a content aware module 234, which may provision content forwarding, content caching, and interest processing in the SDN as discussed above. Processor 230 may also comprise a conference control module 235, which may provide encapsulation and decapsulation functions, including various levels of message header generation and encapsulation functionality as described in methods 400 and 600, and/or path calculation functions as described in process 800. In an alternative embodiment, the content aware module 234 and/or conference control module 235 may be implemented as instructions stored in memory 232, which may be executed by processor 230. The memory module 232 may comprise a cache for temporarily storing content, e.g., a Random Access Memory (RAM). Additionally, the memory module 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230, the cache, and the long-term storage are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Packets received by an SDN IBR may be encapsulated using an SDN flow-specific header for transport and/or routing through the SDN. The encapsulating header may comprise a control field and a Flow ID field. Control field may be used to describe a variety of characteristics, e.g., the length of the encapsulating header, unicast or multicast transmission, backup or primary path transmission, etc. The Flow ID may be used to identify and/or distinguish one or multiple data flows inside an SDN domain. The Flow ID may be allocated either via an Implicit Method embodiment (e.g., relying on lookup tables) or via an Explicit Method embodiment (e.g., expressly containing needed data), as discussed further herein.

Figure 3:
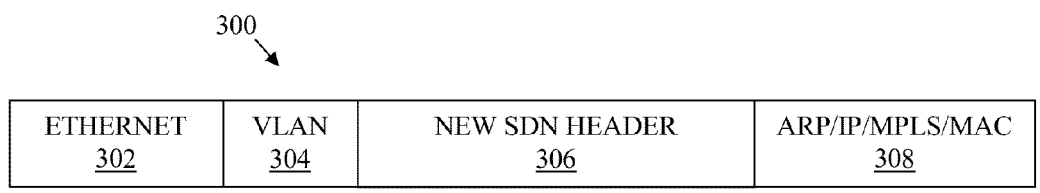
FIG. 3 is an example embodiment of an Ethernet packet including a disclosed SDN header.

In order to encapsulate the new SDN header-encoded packet over an Ethernet network, a new EtherType may be assigned by the Internet Assigned Numbers Authority (TANA). FIG. 3 is an example embodiment of an Ethernet packet 300 including a disclosed SDN header. The Ethernet packet 300 comprises an Ethernet field 302 using a new EtherType (not depicted), a Virtual Local Area Network (LAN) (VLAN) field 304, a new SDN packet header field 306, and a payload field 308, e.g., for transporting Address Resolution Protocol (ARP)/IP/MPLS/MAC-encoded data. Ethernet packets, including EtherType fields and other fields, e.g., source MAC and destination MAC, are generally known and those of ordinary skill will recognize permissible modifications of Ethernet packet 300 in accordance with this disclosure.

Figure 4:
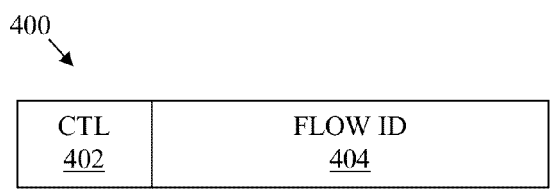
FIG. 4 is an example embodiment of an SDN packet header generated according to the Implicit Method or Explicit Method of packet header generation.

FIG. 4 is an example embodiment of an SDN packet header 400, e.g., the SDN packet header field 306 of FIG. 3, generated according to the Implicit Method or Explicit Method of this disclosure. SDN packet header 400 comprises a control field 402 and a Flow ID field 404. The length control field 402 may differ, e.g., from a two-bit to four-bit field, and may comprise information about the encapsulated data packet, e.g., the length of the SDN header. In the Implicit Method, the control field 402 may comprise bits 0-1 and may provide the appropriate version value, explained below. In the Explicit Method, the control field 402 may comprise bits 0-3, with bits 0-1 providing the appropriate version value, bit 2 providing a backup flow flag, and bit 3 providing a multicast/unicast flag.

The Flow ID field 404 may be a variable length field for storing a Flow ID allocated across the entire SDN domain by an SDN controller, e.g., network controller 102 of FIG. 1. The SDN controller may track Flow ID assignments using various databases, e.g., a free Flow ID pool database (containing unassigned Flow IDs) and an Assigned Flow ID Table database. An assigned Flow ID may be used to switch a flow based on the Flow ID at a system router, e.g., network node 104 of FIG. 1, using a local switching table installed at each router by the SDN controller. The local switching table is discussed further herein. The SDN controller may allocate and/or assign a Flow ID such that a loop in the SDN network will not be formed and packet delivery from the SDN IBR, e.g., network node 104(a) of FIG. 1, to one or multiple SDN EBRs, e.g., network node 104(c) of FIG. 1, is ensured so as to satisfy any preset Service Level Agreement (SLA) requirements for the delivery, e.g., Quality of Service (QoS), Traffic Engineering (TE), etc. The length of the Flow ID may depend on the value of the bits in the control field indicating the protocol version employed, e.g., IP version 4 (IPv4), IPv4 VPN, IP version 6 (IPv6), IPv6 VPN, Virtual Private LAN Service (VPLS), L2 VPN, Multi-Topology (MT), etc., and the method of flow identification, e.g., Implicit Method or Explicit Method. For example, the length of the Flow ID may vary according to Table 1 below showing the version value and corresponding length of SDN packet header and Flow ID:

TABLE 1

The Version Value and the Length of Header and Flow ID

| Version | 0 | 1 | 2 | 3 |
|---|---|---|---|---|
| Total length of new SDN header (Octets) | 4 | 6 | 12 | 16 |
| Total length of Flow ID (bits) Implicit Method | 30 | 46 | 94 | 126 |
| Total length of Flow ID (bits) Explicit Method | 28 | 44 | 92 | 124 |

A Flow ID may be generated from a service request using a Policy Component on the controller. The Policy Component may convert different service requests to a set of tuples. A tuple may be a single row of data from an ordered list of elements. One default policy requirement may be best effort service provision for the traffic, e.g., based on an analysis of the traffic type and SDN EBR ID. For example, if two traffic flows or data streams are of the same type and will pass through an SDN network via the same SDN EBR, then the Flow ID for both flows or data streams may be the same. A more complicated policy may check additional or alternate tuples of the traffic. An example set of tuples is listed below in Table 2:

TABLE 2

Example tuple list for a Flow ID Policy (Implicit Method)

IBR ID
EBR ID
IBR_PORT
EBR_PORT
Network Abstraction, e.g., Table ID for VPN,
Topology (Topo) ID for MT
Traffic type, e.g., Unicast or multicast, L2 or L3, IPv4 or IPv6,
ATM or FR, time-division multiplexing (TDM), SONET, Synchronous
Digital Hierarchy (SDH), etc.
Traffic's Source IP address (if IP traffic)
Traffic's Destination IP address (if IP traffic)
Application's information, Transmission Control Protocol (TCP) or
User Datagram Protocol (UDP), port number (if IP traffic)
Traffic's MPLS label (if MPLS traffic)
Traffic's Source MAC address (if Ethernet traffic)
Traffic's Destination MAC address (if Ethernet traffic)
Traffic's ATM virtual channel identifier (VCI)/virtual path
identifier (VPI) value (if ATM traffic)
Traffic's FR data link connection identifier (DLCI)
value (if Frame Relay traffic)
Traffic's Time-division multiplexing (TDM) time slot (if TDM traffic)
Traffic QoS requirement, such as bandwidth, rate, latency
Traffic TE requirement, such as explicit path information
Any other customer-required properties desired to describe the traffic flow A Policy Component may utilize the service request to obtain an applicable set of tuples. The applicable set of tuples may be assigned to a Flow ID, and consequently a network node, e.g., network nodes 104 of FIG. 1, may use the Flow ID to lookup the applicable set of tuples in a database provided and/or populated by the controller. Table 3 shows various services correlated with sets of tuples described in Table 2:

TABLE 3

Example sets of tuples for different services (Implicit Method)

| Services | Tuples |
|---|---|
| Best effort IP service | EBR_ID, Traffic type, |
| MPLS service without Class of Service (COS) | Network Abstraction (VPN table ID, MT ID (Topo ID)) |
| Normal MAC service | |
| L2/L3 VPN service (no QoS) | |
| IP service with Type of Service (ToX) | EBR_ID, Traffic type, Network Abstraction (VPN table ID, Topo ID) |
| MPLS service with COS | |
| MAC service with QoS | QoS |
| Normal Tunnel Service | EBR_ID, IBR_ID, EBR_PORT, IBR_PORT, Traffic type, Network Abstraction (VPN table ID, Topo ID) |
| TE Tunnel Service | EBR_ID, IBR_ID, EBR_PORT, IBR_PORT, Traffic type, Network Abstraction (VPN table ID, Topo ID) QoS, TE |
| Traffic Aware Routing | EBR_ID, Traffic type, Network Abstraction (VPN table ID, Topo ID) QoS, Traffic-rate |
| Application Aware Routing | EBR_ID, Traffic type, Network Abstraction (VPN table ID, Topo ID) Destination Address, Protocol, Port number |
| Subscriber Aware Routing | EBR_ID, Traffic type, Network Abstraction (VPN table ID, Topo ID) Source Address, Protocol, Port number |

Figure 5:
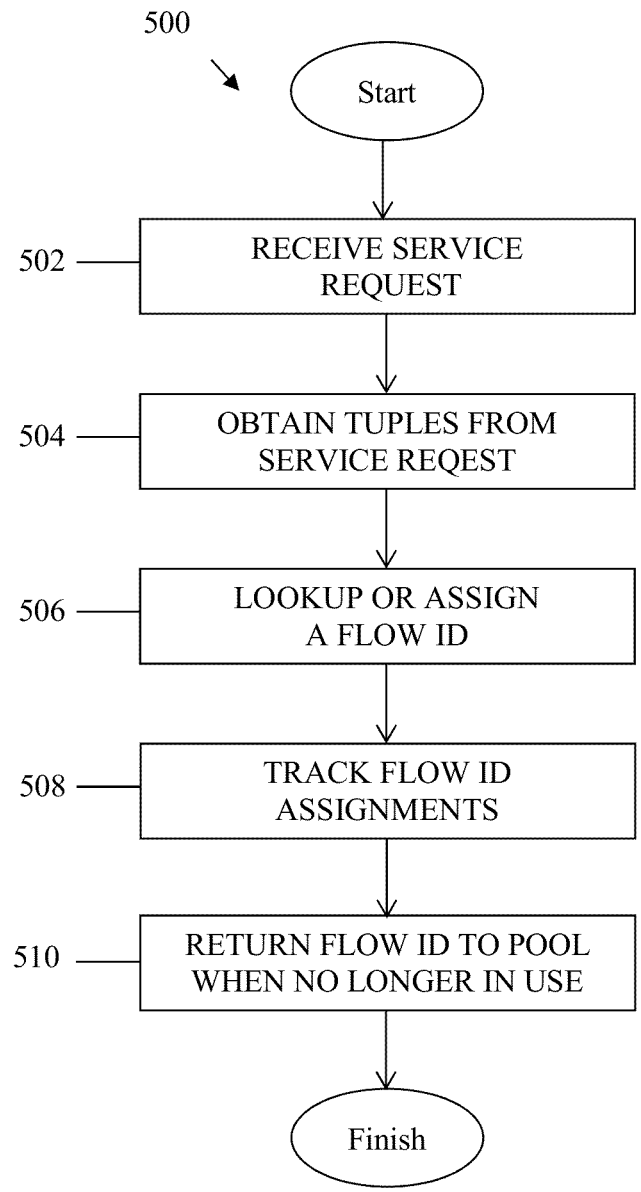
FIG. 5 is a flowchart showing an example method of Flow Identifier (ID) assignment for an Implicit Method.

FIG. 5 is a flowchart showing an example method 500 of Flow ID assignment for an Implicit Method example embodiment of packet header generation. At 502, a controller, e.g., network controller 102 of FIG. 1, may receive a service request at a Service Request Component from a network node, e.g., network node 104(a) of FIG. 1. The service request may be generated from the network node when it receives a packet from outside of SDN, e.g., network 100 of FIG. 1, but the packet may not be forwarded after looking-up the forwarding table. The service request may also be generated by the configuration on the network node. The service request may include the original data packet when a packet cannot be forwarded or may include the destination information when the service request is triggered by configuration. The service request may also include other information related to the service for the packet, e.g., QoS, receiving port, etc. At 504, the Service Request Component may pass the service request to a Policy Component on the controller. The Policy Component may lookup a Flow ID associated with the flow from an internal table. If no Flow ID is identified, the controller may obtain a set of tuples using the service request as described above. The SDN controller may further allocate available Flow IDs to different services. The controller may also utilize various traffic properties for the flow to obtain the Flow ID. At step 506, the controller may lookup a Flow ID from a table using the set of tuples returned by the Policy Component. If an assigned Flow ID is found in the table, the Flow ID may be returned and associated with the service request. If the controller does not find an assigned Flow ID, a Flow ID, e.g., a randomized number within a predefined range, from the free Flow ID pool may be selected, returned, allocated, and associated with the service request. At 508, the controller may track Flow ID assignments, e.g., by inserting the Flow ID into the Assigned Flow ID Table and/or removing the Flow ID from the free Flow ID pool database. The Assigned Flow ID Table may contain all tuples used by a policy to describe a dedicated traffic flow. Each Flow ID in either/both database(s) may further comprise a count indicating how many times a Flow ID is used, reused, or otherwise included in a packet header. The Assigned Flow ID Table may be used for action generation, e.g., for pushing and/or populating an Openflow table in the SDN EBR and IBR. The Flow ID may be returned to the Service Request Component for utilization in encapsulation functionality. When the SDN controller receives notice that a Flow ID is no longer in use, e.g., from a link down event, a customer request, etc., at 510 the Flow ID may be returned to the Flow ID pool in the SDN controller.

Figure 6:
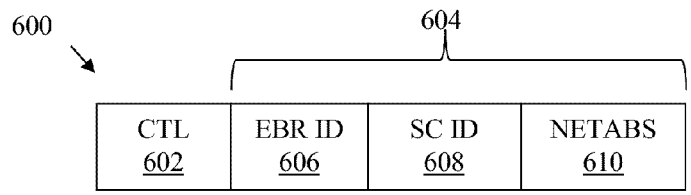
FIG. 6 is an example embodiment of an SDN packet header generated according to the Explicit Method.

FIG. 6 is an example embodiment of an SDN packet header 600, e.g., the SDN packet header field 306 of FIG. 3, generated according to the Explicit Method of this disclosure. SDN packet header 600 comprises a control field 602 and a Flow ID field 604. The Flow ID field 604 may comprise three subfields: EBR/Multicast Tree (MTree) ID field 606, Service Class ID (SC ID) field 608, and Network Abstraction (NetAbs) field 610. The control field 602 may have a four-bit field comprising the following information about the encapsulated data packet: (i) the length of the SDN header (e.g., using bits 0 to 1); (ii) whether the encapsulated packet is a unicast or multicast packet (e.g., using a binary flag bit 2); and (iii) whether the encapsulated packet is comprised within a backup protection flow (e.g., using a binary flag bit 3). Each of the fields may be of fixed length for a particular Version Value for the Flow ID, as illustrated in FIGS. 7-13. For example, EBR/MTree ID field 606 may be 10 bits (bits 4 to 13), SC ID field 608 may be 8 bits (bits 14 to 21), and NetAbs field 610 may be 10 bits (bits 22 to 31). When the multicast bit in control field 602 indicates a unicast transmission, EBR/MTree ID field 606 may provide a unique ID for routing to an SDN EBR. When the multicast bit in control field 602 indicates a multicast and/or a broadcast transmission, the EBR/MTree ID field 606 may indicate a multicast tree ID. In some embodiments, a particular value may indicate broadcast. SC ID field 608 may represent other factors desirable to distinguish traffic. The SC ID field 608 may be mapped from information including (but not limited to): (a) IP differentiated service bits; (b) MPLS Class of service bits; (c) SLA requirements, e.g., bandwidth, rate, latency; (d) application types, e.g., TCP or Tag Distribution Protocol (TDP), port number, etc.; (e) traffic source information, e.g., IBR_PORT, source IP/MAC address, etc.; and (f) traffic destination information, e.g., EBR_PORT, destination IP/MAC address, etc. Since the space of SC ID may be fixed at a limited length, some mapping or hashing function may be used to map any factor to the SC ID. The SDN controller may optionally decide the most efficient way to use the SC ID in order to accommodate traffic differentiation. NetAbs field 610 may be used at the SDN EBR for further processing. The NetAbs field 610 may comprise two elements representing certain network abstraction layer information: network abstraction type (NetAbsT) and network abstraction type ID (NetAbsID). NetAbsT may be used to indicate the type of network abstraction in EBR for particular flows, such as L2 or L3. NetAbsID may be the network abstraction ID associated with the type, e.g., a table or instance ID. The NetAbs field 610 values may therefore indicate information including (but not limited to): (a) traffic type and additional routing information, e.g., L2 (and optionally, e.g., MPLS, TDM, ATM, FR, Ethernet, etc.), L3 (and optionally, e.g., Forwarding Information Base (FIB) for IPv4 or IPv6, Table ID of FIB for IPv4 VPN or IPv6 VPN, VPLS instance ID for VPLS, etc.); and (b) whether the Topo ID is present. When a Topo ID is used, version 0 of the encapsulating header may not be used due to the space constraints of the NetAbsID. Versions 1 to 3 may have a Topo ID size of 8, 12, and 16 bits, respectively. Example headers including Topo IDs are illustrated below in FIGS. 9, 11, and 13. Table 4 shows example definitions of NetAbsT and corresponding definitions of NetAbsID:

TABLE 4

NetAbs definitions

Figure 10:
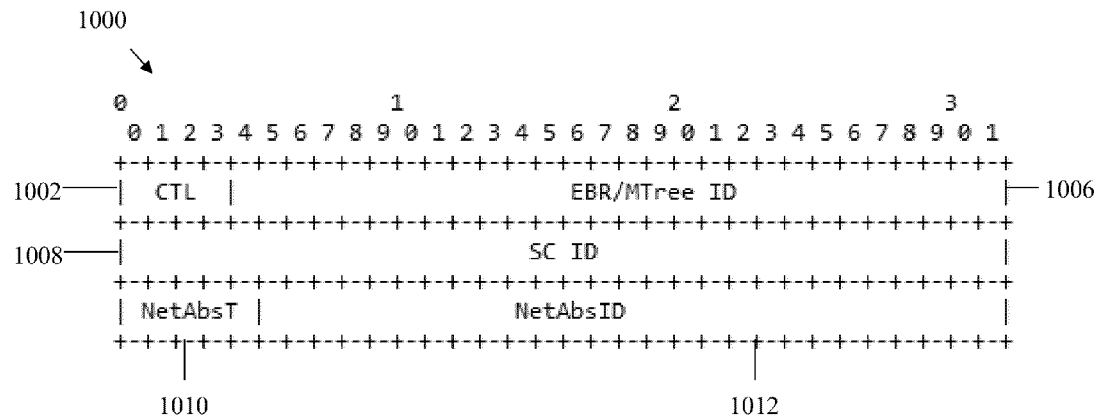
FIG. 10 is an example embodiment of a 12-octet SDN packet header generated according to the Explicit Method.
Figure 11:
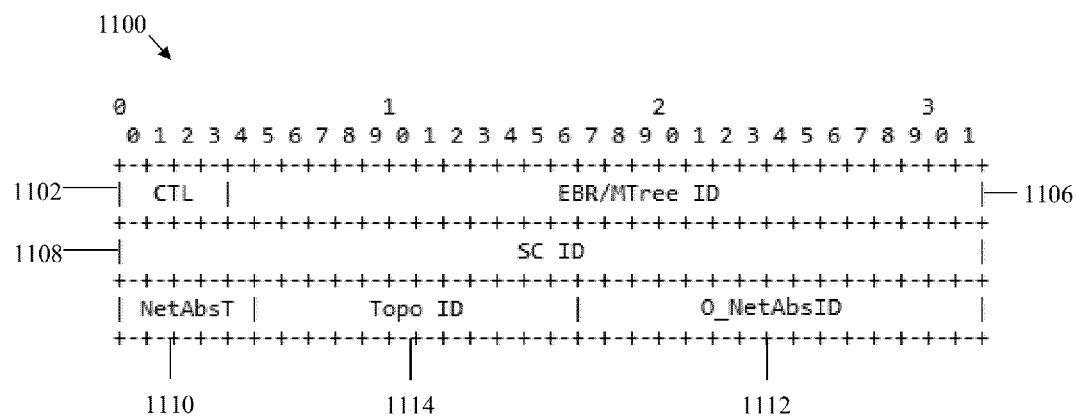
FIG. 11 is an example embodiment of a 12-octet SDN packet header with Topo ID present generated according to the Explicit Method.

| NetAbsT | NetAbsID |
|---|---|
| 00000<br>L3, IPv4 | L3 IPv4 Table ID<br>(Table ID 0 indicates global IPv4) |
| 00001<br>L3, IPv6 | L3 IPv6 Table ID<br>(Table ID 0 indicates global IPv6) |
| 01xxx<br>L3, MT | L3 Topo ID is present at upper 8, 12, 16 bits for ver. 1, 2, 3, respectively |
| 01000<br>L3, IPv4, MT | L3 Topo ID (upper 8, 12, 16 bits for ver. 1, 2, 3)<br>Remained bits for IPv4 Table ID, see FIG. 11<br>Does not apply to Version 0 |
| 01001<br>L3, IPv6, MT | L3 Topo ID (upper 8, 12, 16 bits for ver. 1, 2, 3, respectively)<br>Remained bits for IPv6 Table ID, see FIG. 11<br>Does not apply to Version 0 |
| 10000<br>L2, MAC | MAC Table ID |
| 10001<br>L2, VPLS | VPLS Instance ID |
| 10010<br>L2, MPLS | MPLS table ID |
| 10011<br>L2, ATM | ATM table ID |
| 10100<br>L2, FR | FR table ID |
| 10101<br>L2, TDM | TDM time slot table ID |
| 11xxx<br>L2, MT | L2 Topo ID is present at upper 8, 12, 16 bits for version 1, 2, 3, respectively |
| 11010<br>L2, MPLS, MT | MPLS Topo ID (upper 8, 12, 16 bits for version 1, 2, 3, respectively)<br>Remained bits for MPLS Table ID, see FIG. 10<br>Does not apply to Version 0 |
| Other values | To Be Determined (TBD) |

For the different versions of the generated encapsulating SDN header, the allowed length for NetAbs field may differ and consequently the maximum size of NetAbsID may differ. As a result, the proper version of the new SDN header may be selected to accommodate the extreme case. For example, when the Multiple-topology is used, the version 0 of the new SDN header may not be used since the space of NetAbsID may be insufficient to embed the Topo ID.

The Policy Component may utilize the service request to obtain an applicable set of tuples. The applicable set of tuples may be assigned to a Flow ID, and consequently a network node, e.g., network nodes 104 of FIG. 1, may use the Flow ID to lookup the applicable set of tuples, e.g., in an Explicit Method Assigned Flow ID table. The Explicit Method Assigned Flow ID table may be simpler than in the Implicit Method Assigned Flow ID table since most of the traffic information may be retrieved from the Flow ID itself. In some Explicit Method example embodiments, each Flow ID may comprise (a) a count to indicate how many times the Flow ID is used; and (b) detailed service class information. Table 5 shows the set of tuples generated by Policy to construct the Flow ID for different services. In the table, NetAbsID includes NetAbsT information. The example in Table 5 shows various services correlated with sets of tuples utilized to construct the Flow ID:

TABLE 5

Example sets of tuples for different services (Explicit Method)

| Service | Tuples to construct the Flow ID |
|---|---|
| Best effort IP service | EBR_ID, NetAbsID |
| MPLS service without COS | |
| Normal MAC service | |
| L2/L3 VPN service (no QoS) | |
| IP service with Type of Service (TOS) | EBR_ID, SC_ID (mapping from TOS/COS/QOS), NetAbsID |
| MPLS service with COS | |
| MAC service with QoS | |
| Normal Tunnel Service | EBR_ID, SC_ID(mapping from IBR_ID, IBR_PORT), NetAbsID |
| TE Tunnel Service | EBR_ID, SC_ID (mapping from IBR_ID, IBR_PORT, EBR_PORT and QoS), NetAbsID |
| Traffic Aware Routing | EBR_ID, SC_ID(mapping from Traffic-rate, QoS), NetAbsID |
| Application Aware Routing | EBR_ID, SC_ID (mapping from Traffic destination info: e.g., address, protocol, port number), NetAbsID |
| Subscriber Aware Routing | EBR_ID, SC_ID (mapping from Traffic source info: e.g., address, protocol, port number), NetAbsID |

Figure 7:
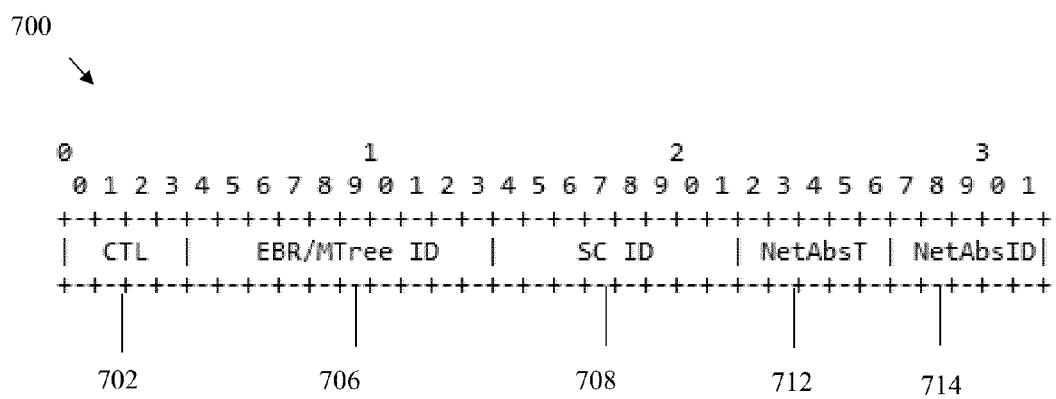
FIG. 7 is an example embodiment of a four-octet SDN packet header generated according to the Explicit Method.

FIG. 7 is an example embodiment of an SDN packet header 700, e.g., the SDN packet header field 600 of FIG. 6, generated according to the Explicit Method of this disclosure using the version value 0 from Table 1, supra. The fields in SDN packet header 700 may be substantially the same as the corresponding fields in SDN packet header 600 except as noted. The SDN packet header 700 may have a total length of four octets. The EBR/MTree ID field 706 may be 10 bits, from bit 4 to bit 13, with the multicast bit clear for the EBR ID and the multicast bit set for the MTree ID. The SC ID field 708 may be 8 bits, from bit 14 to bit 21. The NetAbsT field 712 may be 5 bits, from bit 22 to bit 26. The NetAbsID field 714 may be 5 bits, from bit 27 to bit 31. The NetAbsT field 712 together with the NetAbsID field 714 may correspond to the NetAbs field 610 of FIG. 6.

Figure 8:
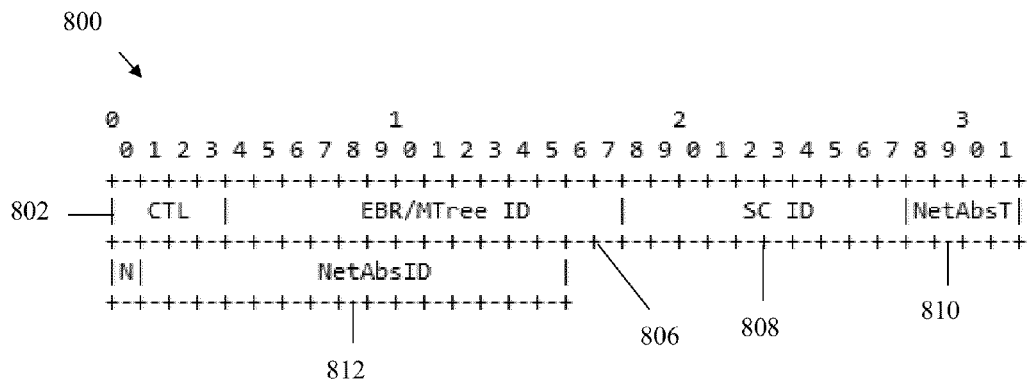
FIG. 8 is an example embodiment of a six-octet SDN packet header generated according to the Explicit Method.

FIG. 8 is an example embodiment of an SDN packet header 800 (without Topo ID), e.g., the SDN packet header field 600 of FIG. 6, generated according to the Explicit Method of this disclosure using the version value 1 from Table 1, supra. The fields in SDN packet header 800 may be substantially the same as the corresponding fields in SDN packet header 600 except as noted. The SDN packet header 800 may have a total length of six octets. The EBR/MTree ID field 806 may be 14 bits, from bit 4 to bit 17, with the multicast bit clear for the EBR ID and the multicast bit set for the MTree ID. The SC ID field 808 may be 10 bits, from bit 18 to bit 27. The NetAbsT field 810 may be 5 bits, from bit 28 to bit 32. The NetAbsID field 812 may be 15 bits, from bit 33 to bit 47. The NetAbsT field 810 together with the NetAbsID field 812 may correspond to the NetAbs field 610 of FIG. 6.

Figure 9:
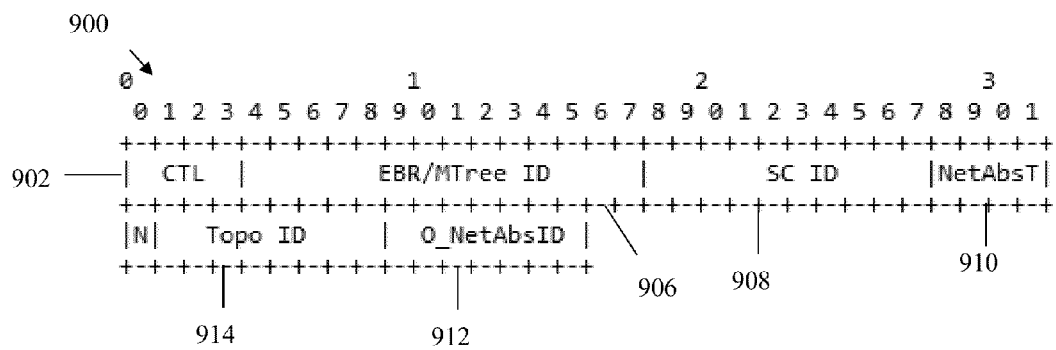
FIG. 9 is an example embodiment of a six-octet SDN packet header with Topo ID present generated according to the Explicit Method.

FIG. 9 is an example embodiment of an SDN packet header 900 (with Topo ID), e.g., the SDN packet header field 600 of FIG. 6, generated according to the Explicit Method of this disclosure using the version value 1 from Table 1, supra. The fields in SDN packet header 900 may be substantially the same as the corresponding fields in SDN packet header 800 except as noted. SDN packet header 900 may further include a Topo ID field 914, described under FIG. 6, between the NetAbsT field 910 and the O_NetAbsID field 912. The O_NetAbsID field 912 may be another NetAbsID field for storing another NetAbsID.

FIG. 10 is an example embodiment of an SDN packet header 1000 (without Topo ID), e.g., the SDN packet header field 600 of FIG. 6, generated according to the Explicit Method of this disclosure using the version value 2 from Table 1, supra. The fields in SDN packet header 1000 may be substantially the same as the corresponding fields in SDN packet header 600 except as noted. The SDN packet header 1000 may have a total length of 12 octets. The EBR/MTree ID field 1006 may be 28 bits, from bit 4 to bit 31, with the multicast bit clear for the EBR ID and the multicast bit set for the MTree ID. The SC ID field 1008 may be 32 bits, from bit 32 to bit 63. The NetAbsT field 1010 may be 5 bits, from bit 64 to bit 68. The NetAbsID field 1012 may be 27 bits, from bit 69 to bit 95. The NetAbsT field 1010 together with the NetAbsID field 1012 may correspond to the NetAbs field 610 of FIG. 6.

FIG. 11 is an example embodiment of an SDN packet header 1100 (with Topo ID), e.g., the SDN packet header field 600 of FIG. 6, generated according to the Explicit Method of this disclosure using the version value 2 from Table 1, supra. The fields in SDN packet header 1100 may be substantially the same as the corresponding fields in SDN packet header 1000 except as noted. SDN packet header 1100 may further include a Topo ID field 1114, described under FIG. 6, between the NetAbsT field 1110 and the O_NetAbsID field 1112. The O_NetAbsID field 1112 may be another NetAbsID field for storing another NetAbsID.

Figure 12:
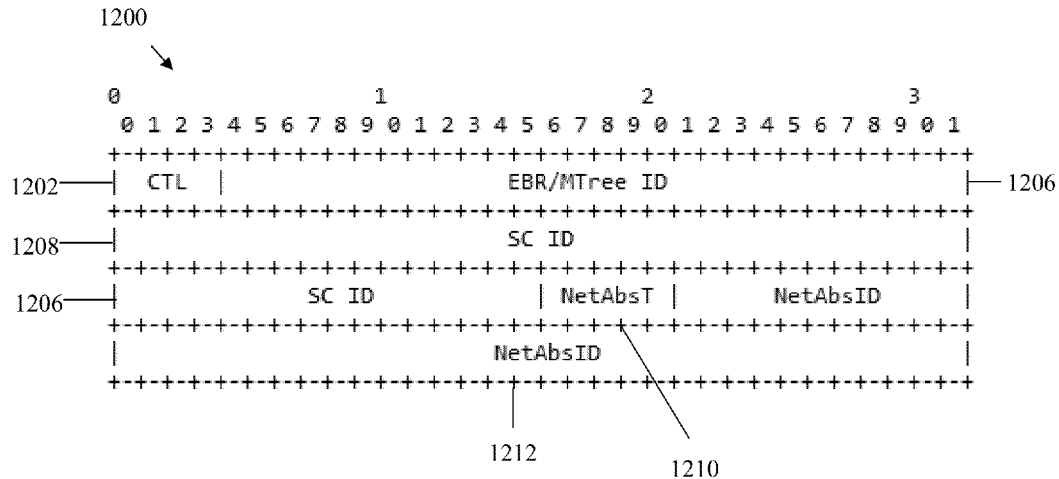
FIG. 12 is an example embodiment of a 16-octet SDN packet header generated according to the Explicit Method.

FIG. 12 is an example embodiment of an SDN packet header 1200 (without Topo ID), e.g., the SDN packet header field 600 of FIG. 6, generated according to the Explicit Method of this disclosure using the version value 3 from Table 1, supra. The fields in SDN packet header 1200 may be substantially the same as the corresponding fields in SDN packet header 600 except as noted. The SDN packet header 1200 may have a total length of 16 octets. The EBR/MTree ID field 1206 may be 28 bits, from bit 4 to bit 31, with the multicast bit clear for the EBR ID and the multicast bit set for the MTree ID. The SC ID field 1208 may be 48 bits, from bit 32 to bit 79. The NetAbsT field 1210 may be 5 bits, from bit 80 to bit 84. The NetAbsID field 1212 may be 43 bits, from bit 85 to bit 127. The NetAbsT field 1210 together with the NetAbsID field 1212 may correspond to the NetAbs field 610 of FIG. 6.

Figure 13:
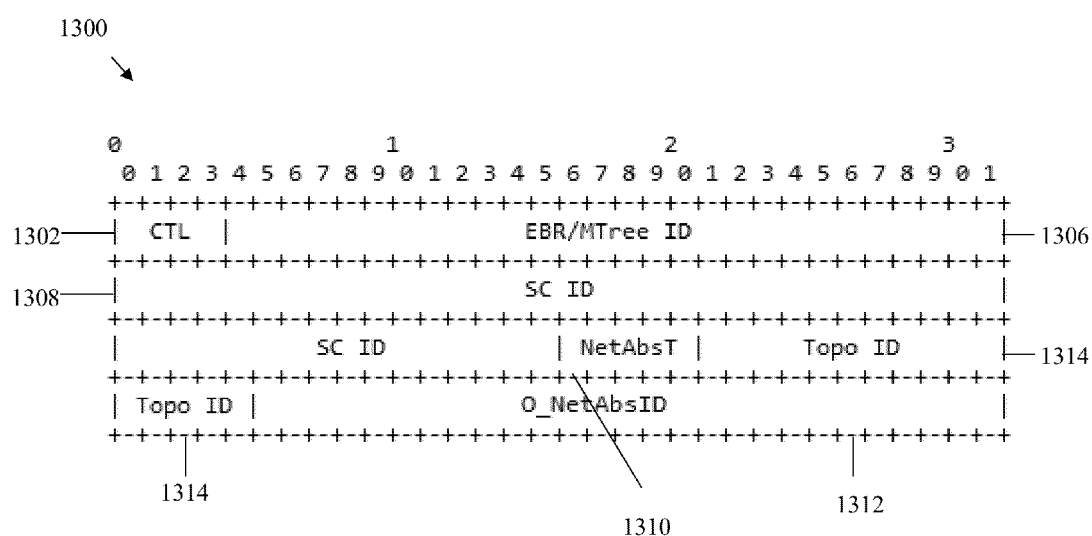
FIG. 13 is an example embodiment of a 16-octet SDN packet header with Topo ID present generated according to the Explicit Method.

FIG. 13 is an example embodiment of an SDN packet header 1300 (with Topo ID), e.g., the SDN packet header field 600 of FIG. 6, generated according to the Explicit Method of this disclosure using the version value 3 from Table 1, supra. The fields in SDN packet header 1200 may be substantially the same as the corresponding fields in SDN packet header 1200 except as noted. SDN packet header 1300 may further include a Topo ID field 1314, described under FIG. 6, between the NetAbsT field 1310 and the O_NetAbsID field 1312. The O_NetAbsID field 1312 may be another NetAbsID field for storing another NetAbsID.

Figure 14:
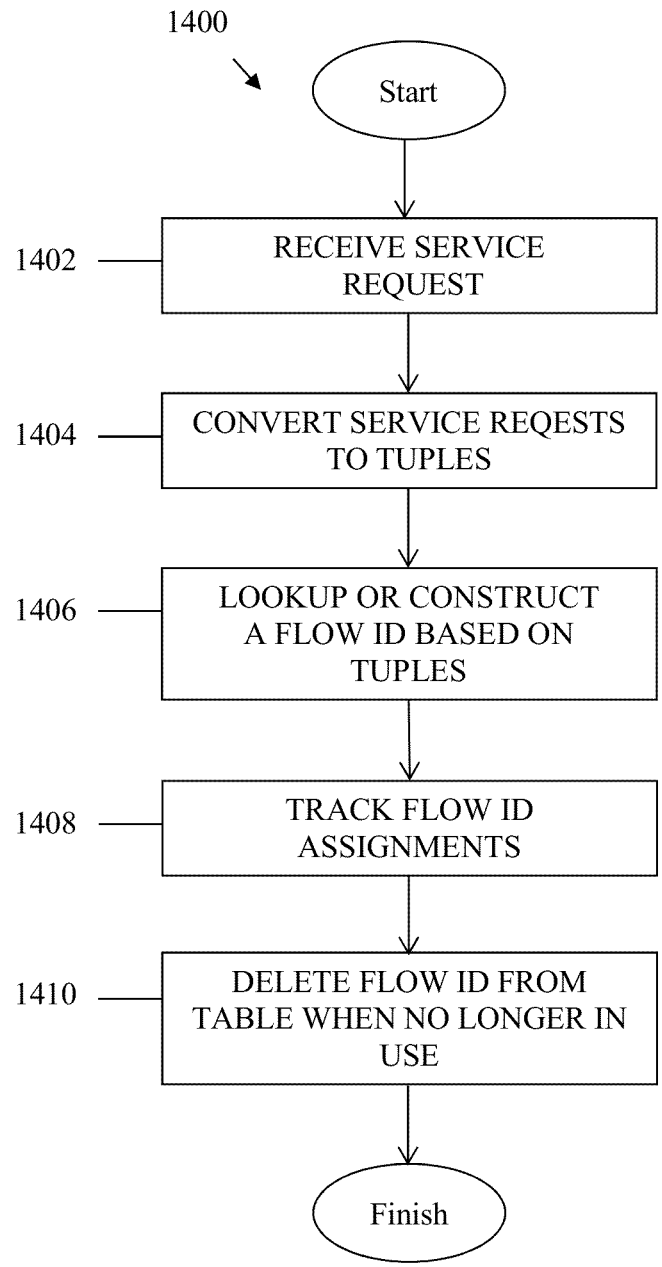
FIG. 14 is a flowchart showing an example method of Flow ID assignment for an Explicit Method example embodiment of packet header generation.

FIG. 14 is a flowchart showing an example method 1400 of Flow ID assignment for an Explicit Method example embodiment of packet header generation. The steps of method 1400 may be substantially the same as the steps of method 500 except as indicated below. At 1402, a controller, e.g., network controller 102 of FIG. 1, may receive a service request at a Service Request Component from a network node, e.g., network node 104(*a*) of FIG. 1. The service request may be generated from the network node when it receives a packet from outside of SDN, e.g., network 100 of FIG. 1, but the packet may not be forwarded after looking-up the forwarding table. The service request may also be generated by the configuration on the network node. The service request may include the original data packet when a packet cannot be forwarded or may include the destination information when the service request is triggered by configuration. The service request may also include other information related to the service for the packet, e.g., QoS, receiving port, etc. At 1404, the Service Request Component may pass the service request to a Policy Component on the controller. The Policy Component may construct a Flow ID from a table using a set of tuples and the information contained in the service request. At step 1406, the Policy Component may lookup a Flow ID associated with the flow from an internal table. If an assigned Flow ID is found in the table, the Flow ID may be returned and associated with the service request. If no Flow ID is identified, the controller may construct a Flow ID using the set of tuples and service request information as described above. At 1408, the controller may track Flow ID assignments, e.g., by inserting the Flow ID into the Assigned Flow ID Table. The Flow ID may be returned to the Service Request Component for utilization in encapsulation functionality. When the SDN controller receives notice that a Flow ID is no longer in use, e.g., from a link down event, a customer request, etc., at 1410, the Flow ID may be deleted from the Flow ID table at the SDN controller.

Figure 15:
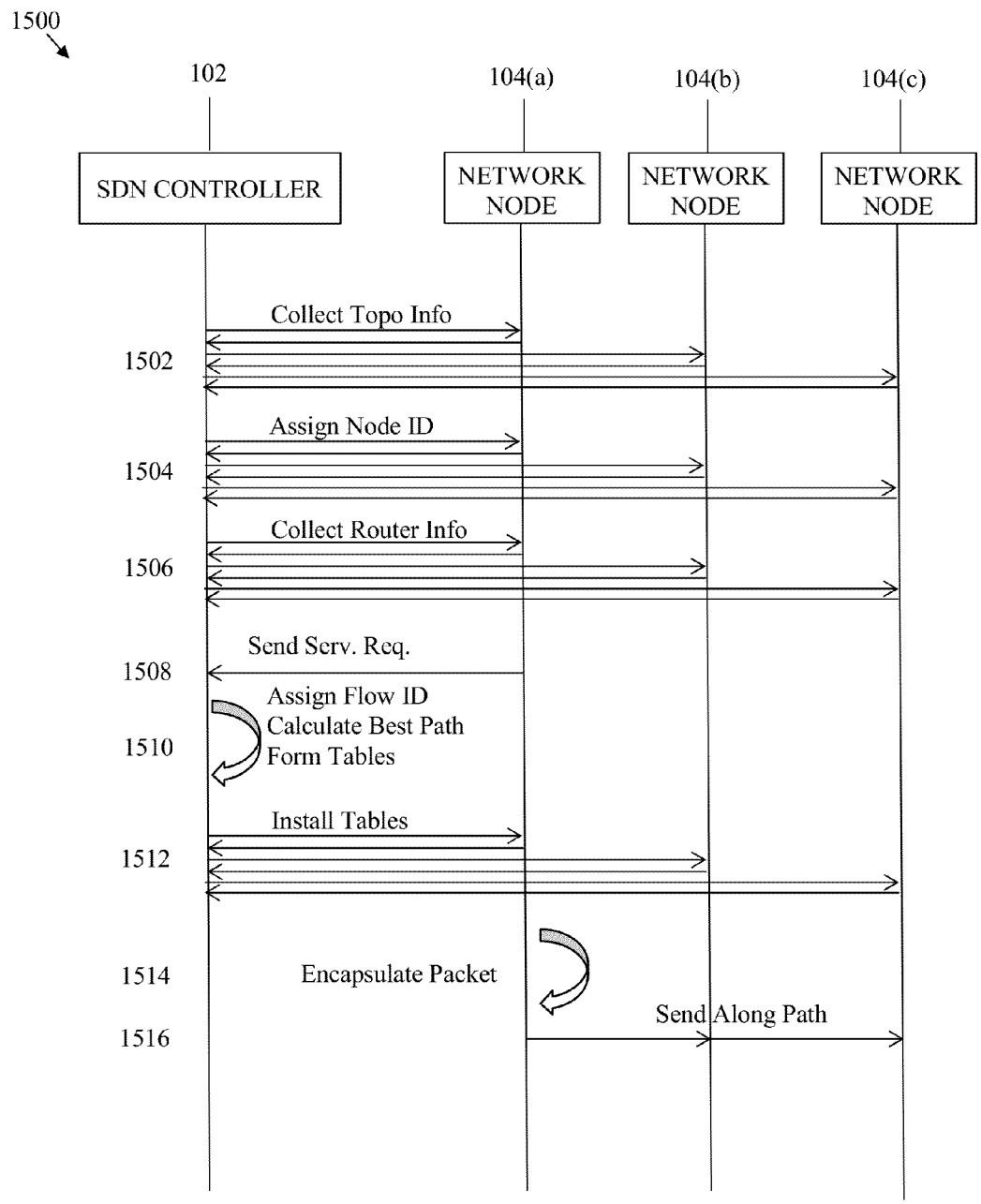
FIG. 15 is a protocol diagram showing a process for an SDN controller to establish a mechanism for encoding packets for transport over the SDN network.

FIG. 15 is a protocol diagram showing a process 1500 for an SDN controller to establish a mechanism for encoding packets for transport over the SDN network in accordance with encapsulation methods disclosed above. The components depicted in FIG. 15 may be substantially the same as the components of FIG. 1 except as otherwise noted below. At 1502, controller 102 may collect the topological information for the SDN network, e.g., network 100 of FIG. 1. At 1504, controller 102 may assign a unique node ID to each network node 104, e.g., an EBR ID, an IBR ID, a transit node ID, etc. At 1506, the controller 102 may collect routing information from each network node 104, e.g., routing protocol packets, load, bandwidth, etc. The routing protocol may be configured for any router. The routing protocol packet processing may be distributed on each network node or centralized on SDN controller. As will be understood to those of skill in the art, such collection may be periodic or continuous. At 1508, network node 104(*a*) may function as an IBR and may receive a packet from an external node (not pictured) and may search a designated forwarding/switching table. Upon failure to find an associated table entry, network node 104(*a*) may generate a service request and may send the service request to the SDN controller 102. At 1510, the controller 102 may assign a Flow ID, e.g., using the Implicit Method or Explicit method, and may calculate the best path for routing traffic through the SDN, for example, from an IBR, e.g., network node 104(*a*), to an EBR, e.g., network node 104(*c*), via a TR, e.g., network node 104(*b*). This calculation may occur according to one or more service requirements. The controller 102 may calculate the best path using a known mechanism, e.g., SPF, constrained SPF (CSPF) with one or more desired constraints, e.g., TE, QoS, etc. At 1512, the controller 102 may install the lookup and/or forwarding tables at the network nodes 104. At 1514, network node 104(*a*) may utilize the data sent by the SDN controller 102 to encapsulate the packet that cannot be forwarded and triggered the service request. At 1516, the network node 104(*a*) may send the packet along the path calculated by the SDN controller 102, e.g., via transit node 104(*b*) to EBR 104(*c*), which node may then decapsulate the packet and forward the packet along to a node outside of the SDN. At 1508, if the lookup for the received packet can find an entry in the designated forwarding table, the packet may be encapsulated with the information inside the forwarding/switching table entry, and may be sent to the next hop of the network node along the path. In all transit nodes, the packet may be forwarded by looking up the packet using its SDN header which was encapsulated at the IBR.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An ingress node in a Software Defined Network (SDN) comprising:
   a receiver for receiving a data packet from outside the SDN, wherein the data packet is part of a flow;
   a transmitter; and
   a processor coupled to the receiver and the transmitter, wherein the processor is configured to:
   generate a service request comprising tuples indicating a policy for a service to be applied to the flow;
   cause the transmitter to transmit the service request to a SDN controller;
   receive, via the receiver, a Flow identifier (ID) corresponding to the tuples such that the Flow ID indicates the policy for the service to be applied to the flow;
   obtain the data packet from the receiver;
   encapsulate the data packet in an SDN packet header comprising the Flow ID from the SDN controller to cause the data packet to be treated according to the policy; and
   cause the transmitter to transmit the encapsulated data packet across the SDN toward an egress node in the SDN.

2. The ingress node of claim 1, wherein the ingress node is further configured to apply a plurality of policies to a plurality of flows encoded with different traffic protocols by describing the policies as tuples.

3. The ingress node of claim 1, wherein the SDN packet header is removable by the egress node prior to transmission to a final destination, wherein the final destination is attached to the egress node or is attached to a remote SDN domain.

4. The ingress node of claim 1, wherein the SDN packet header comprises a field for identifying at least one packet-specific property and a field for identifying the flow.

5. The ingress node of claim 4, wherein the packet-specific property comprises a packet header length.

6. The ingress node of claim 4, wherein the field for identifying the flow comprises at least one of an egress node identification, a service class identification, or a network abstraction identification.

7. In a network node of a Software Defined Network (SDN), a method of routing a packet comprising:
   receiving a first data packet from a first flow and a second data packet from a second flow, wherein the first data packet and the second data packet are encoded using different traffic protocols, encoded using a common traffic protocol with different source or destination addresses, or encoded using the common traffic protocol with different policy requirements;
   transmitting, to a SDN controller, one or more service requests comprising a first set of tuples indicating a first policy for a first service to be applied to the first flow and a second set of tuples indicating a second policy for a second service to be applied to the second flow;
   receiving, from the SDN controller, a first Flow identifier (ID) corresponding to the first set of tuples and a second Flow ID corresponding to the second set of tuples such that the Flow IDs indicate the policies for the services to be applied to the first flow and the second flow;
   encapsulating the first data packet and the second data packet using a packet header specific to a SDN domain of the SDN, wherein each packet header comprises a field for identifying at least one packet-specific property and a field for encoding an associated Flow ID to cause the first data packet to be treated according to the first policy and the second data packet to be treated according to the second policy; and
   transmitting the encapsulated first data packet and the encapsulated second data packet across a single SDN domain to a receiving node.

8. The method of claim 7, wherein the packet-specific property comprises a packet header length, a unicast or multicast packet transmission, or a primary or backup flow packet transmission.

9. The method of claim 7, and wherein the field for encoding the associated Flow ID comprises at least one of an egress node identification, a service class identification, or a network abstraction identification.

10. The method of claim 9, wherein the packet header size is 4, 6, 12, or 16 octets.

11. The method of claim 7, wherein each data packet is encapsulated for single layer stack transmission across the SDN.

12. The method of claim 7, wherein the first data packet and the second data packet are encoded using different traffic protocols, and wherein the different traffic protocols are protocols comprising one of a Media Access Control (MAC), an Internet Protocol (IP), a Multiprotocol Label Switching (MPLS), an Asynchronous Transfer Mode (ATM)/Frame Rate (FR), or a Synchronous Optical Networking (SONET).

13. The method of claim 7, wherein the receiving node is an SDN egress node, and wherein the packet header is configured to be removable by the receiver receiving node prior to transmission to a final destination.

14. The method of claim 7, wherein the receiving node is not an SDN egress node.

15. A computer program product comprising computer executable instructions stored on a non-transitory medium that when executed by a processor cause the processor to:
   receive a first data packet from a first flow and a second data packet from a second flow, wherein the first data packet and the second data packet are encoded using different traffic protocols, using a common traffic protocol with different source or destination addresses, or using the common traffic protocol with different policy requirements;
   transmit, to a Software Defined Network (SDN) controller, one or more service requests indicating a first service to be applied to the first flow and a second service to be applied to the second flow;
   receive, from the SDN controller, a first Flow identifier (ID) that indicates a first policy to be applied to the first flow based on the first service and a second Flow ID that indicates a second policy to be applied to the second flow based on the second service;
   encapsulate the first data packet with a first packet header comprising the first Flow ID and encapsulate the second data packet with a second packet header comprising the second Flow ID; and
   transmit the encapsulated first data packet and the encapsulated second data packet across a single SDN domain in the SDN toward an egress node in the SDN, wherein each packet header comprises a field for identifying at least one packet-specific property and a field for encoding an associated Flow ID to cause the first data packet to be treated according to the first policy and the second data packet to be treated according to the second policy.

16. The computer program product of claim 15, wherein each packet header is configured for single layer stack transmission across the SDN.

17. The computer program product of claim 15, wherein the packet header size is 4, 6, 12, or 16 octets.

18. The computer program product of claim 15, wherein the packet-specific property comprises a packet length, a unicast or multicast packet transmission, or a primary or backup flow packet transmission.

19. The computer program product of claim 18, wherein the field for encoding the associated Flow ID comprises at least one of an egress node identification, a service class identification, or a network abstraction identification.

20. The computer program product of claim 15, wherein the packet headers are configured to be removable by the egress node prior to transmission to a final destination.

* * * * *

UNITED STATES PATENT AND TRADEMARK OFFICE
CERTIFICATE OF CORRECTION

PATENT NO. : 9,215,093 B2  Page 1 of 1
APPLICATION NO. : 14/043048
DATED : December 15, 2015
INVENTOR(S) : Lin Han et al.

It is certified that error appears in the above-identified patent and that said Letters Patent is hereby corrected as shown below:

IN THE CLAIMS

Column 16, Claim 9, Line 9 should read:

The method of claim 7, wherein the field for encoding the associated Flow ID comprises at least one of an egress node identification, a service class identification, or a network abstraction identification.

Column 16, Claim 13, Line 26 should read:

The method of claim 7, wherein the receiving node is an SDN egress node, and wherein the packet header is configured to be removable by the receiving node prior to transmission to a final destination.

Signed and Sealed this
Twelfth Day of April, 2016

Michelle K. Lee
*Director of the United States Patent and Trademark Office*